United States Patent [19]

Ikuta et al.

[11] Patent Number: 4,825,298
[45] Date of Patent: Apr. 25, 1989

[54] HALFTONE DOT-GENERATOR AND GENERATING METHOD

[75] Inventors: Kunio Ikuta; Masayuki Murai, both of Kyoto, Japan

[73] Assignee: Dainippon Screen Mfg. Co., Ltd., Kyoto, Japan

[21] Appl. No.: 196,332

[22] Filed: May 18, 1988

[30] Foreign Application Priority Data

May 26, 1987 [JP] Japan .................... 62-128760

[51] Int. Cl.⁴ .............................................. H04N 1/23
[52] U.S. Cl. ...................... 358/298; 358/283; 358/75; 358/78
[58] Field of Search ................ 358/298, 75, 78, 283

[56] References Cited

U.S. PATENT DOCUMENTS

| | | | |
|---|---|---|---|
| 4,456,924 | 6/1984 | Rosenfeld | 358/75 |
| 4,499,489 | 2/1985 | Gall | 358/75 |
| 4,543,613 | 9/1985 | Sakamoto | 358/298 |
| 4,547,814 | 10/1985 | Hirosawa | 358/298 |
| 4,673,971 | 6/1987 | Ikuta | 358/75 |

Primary Examiner—E. A. Goldberg
Assistant Examiner—Scott A. Rogers
Attorney, Agent, or Firm—Lowe, Price, LeBlanc, Becker & Shur

[57] ABSTRACT

A film coordinate generator generates film coordinates (u, v), corresponding to the position of an exposure beam on a recording film which is detected by encorders, which is in turn supplied to a screen coodinate generator to be converted into virtual screen coordinates (x, y). A beam control signal generator receives the coordinates (x, y) and an image signal corresponding to the position of the exposure beam to output a beam control signal indicating lighting of the exposure beam when one of the coordinates (x, y) is in between upper and lower limit values, corresponding to the same, which are previously decided for each combination of the other of the coordinates (x, y) and the density value of the image signal.

8 Claims, 6 Drawing Sheets

HALFTONE DOT-GENERATOR AND GENERATING METHOD

BACKGROUND OF THE INVENTION

1. Field of the Invention

The present invention relates to a halftone dot generator and generating method for use in recording an original as a halftone dot image on a photosensitive material by an image scanning/recording apparatus such as an electronic color process scanner.

2. Description of the Prior Art

All conventional halftone dot generators and generating methods for performing such a halftone dot generating processing in any desired screen angle are based on the following idea. Namely, position coordinates (u, v) of an exposure beam on a recording film are converted into virtual screen coordinates (x, y) of a desired screen angle and ruling. A density threshold is read out from a pattern memory in which the density distribution pattern of the virtual screen is previously written, on the basis of the coordinates (x, y). The on/off operation of an exposure beam is controlled by comparing the density threshold as read out with a density value of an image signal corresponding to the position of the exposure beam, to record a desired halftone dot image on the recording film.

FIG. 1 shows an example of the density distribution pattern of a unit halftone dot stored in the pattern memory, wherein a density mountain is so formed on an x-y coordinate plane that the density threshold is uniquely determined for any virtual screen coordinates (x, y).

In the conventional method as hereinbefore described, however, a degree of freedom is restricted in applying different halftone dot configurations such as a circle, a triangle and a square for each specific density range of the image signal, for example, for the purpose of giving a special effect to duplication, since the density threshold can take only one value for each virtual screen coordinates (x, y).

SUMMARY OF THE INVENTION

The present invention is directed to a halftone dot generator and a halftone dot generating method for use in a recording system for recording an halftone dot image on a photosensitive material by an exposure beam.

In the first aspect, a halftone dot generator according to the present invention comprises: means for detecting a position of the exposure beam on the photosensitive material; means for converting the position of the exposure beam as detected virtual screen coordinates (x, y) in a prescribed screen angle and a prescribed screen ruling; means for providing an image signal corresponding to the position of the exposure beam as detected; and means for receiving the coordinates (x, y) and the image signal to provide a control signal indicating lighting of the exposure beam when first one of the coordinates (x, y) as received is in between an upper limit value and a lower limit value, corresponding to the first one of the coordinates (x, y) as received, which are previously determined for each combination of second one of the coordinates (x, y) and a density value of the image signal.

In a preferred embodiment, said means for receiving includes a look-up table memory for receiving the coordinates (x, y) and the image signal to read out the control signal in accordance with a combination of the coordinates (x, y) and the density value of the image signal.

In another preferred embodiment, said means for receiving comprises: memory means for receiving the second one of the coordinates (x, y) and the image signal to read out the upper limit value and the lower limit value of the first one of the coordinates (x, y) as previously stored; and means for providing the control signal when the first one of the coordinates (x, y) is in between the upper limit value and the lower limit value as read out.

In the second aspect, a halftone dot generating method according to the present invention comprises the steps of: detecting a position of the exposure beam on the photosensitive material; converting the position of the exposure beam as detected into virtual screen coordinates (x, y) in a prescribed screen angle and a prescribed screen ruling; providing an image signal corresponding to the position of the exposure beam as detected; and providing a control signal indicating lighting of the exposure beam when first one of the coordinates (x, y) as converted is in between an upper limit value and a lower limit value, corresponding to the first one of the coordinates (x, y) as converted, which are previously determined for each combination of second one of the coordinates (x, y) and a density value of the image signal.

According to the present invention, a density distribution pattern in which a density threshold can take plural values for given virtual screen coordinates (x, y) is applicable, so that a desired special effect can be easily obtained.

Accordingly, it is an object of the present invention to provide a halftone dot generator and a halftone dot generating method which can generate not only a normal halftone dot image but also a special halftone dot image in desired special effect by freely setting a plurality of density threshold values for any desired virtual screen coordinates (x, y).

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 2:
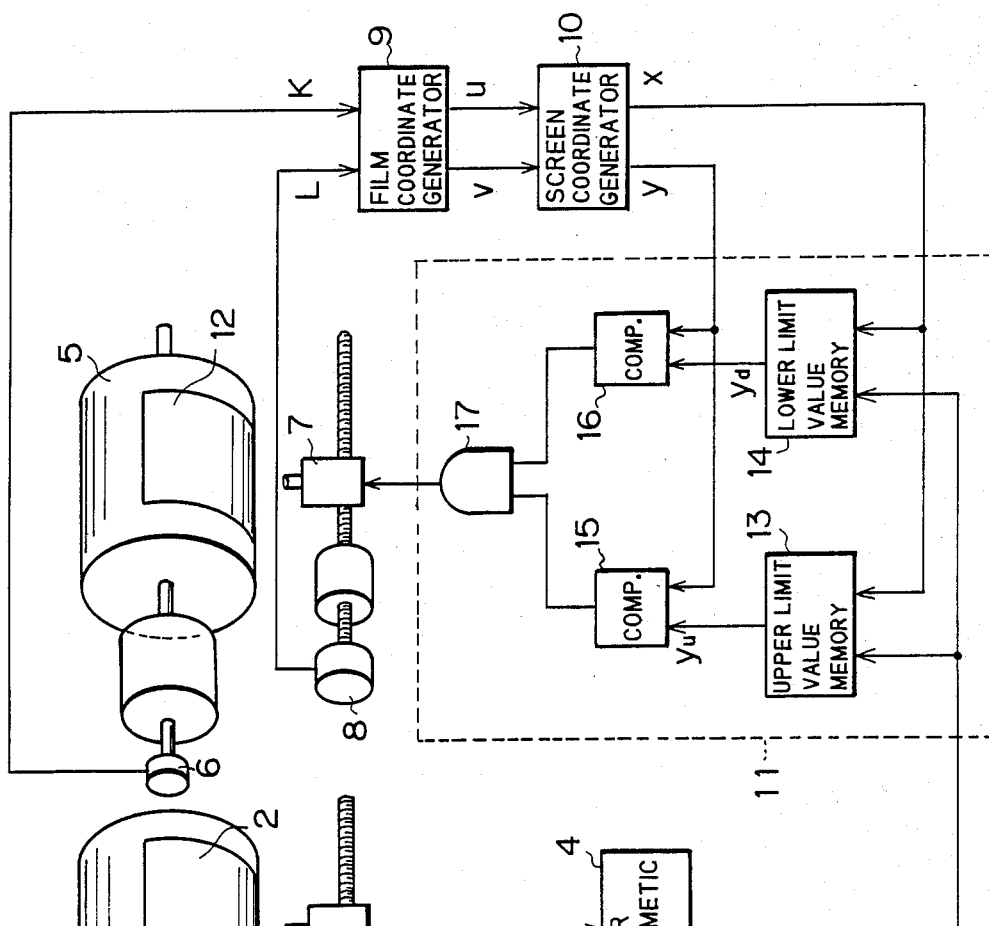
FIG. 2 shows the whole structure of a drum type electronic process scanner to which an embodiment of a halftone dot generator according to the present invention is applied.

FIG. 2 shows the whole structure of a drum type electronic process scanner to which an embodiment of an halftone dot generator according to the present invention is applied. An original 2 put on an original cylinder 1 is photoelectrically scanned by a scanning head 3 in accordance with the rotation of the original cylinder 1 and the movement of the scanning head 3 in the direction of the axis of the original cylinder 1. A signal thus obtained through the scanning head 3 is subjected to necessary processings such as color and gradation corrections in a color arithmetic part 4 to be output as a signal $S_{ig}$.

A rotary encoder 6 is interlocked with a recording cylinder 5 to output a position signal K for a main scanning direction, and another rotary encoder (or a linear encoder) 8 is interlocked with a recording head 7 to output another position signal L for a subscanning direction. A film coordiante generator 9 is supplied with the signals K and L to generate film coordinates (u, v), a minimum unit of which is an exposure pixel in the recording side. The film coordinates (u, v) are input to a screen coordinate generator 10 to be converted into screen coordinates (x, y) of a virtual screen through the hereinafter described procedure.

Figure 3:
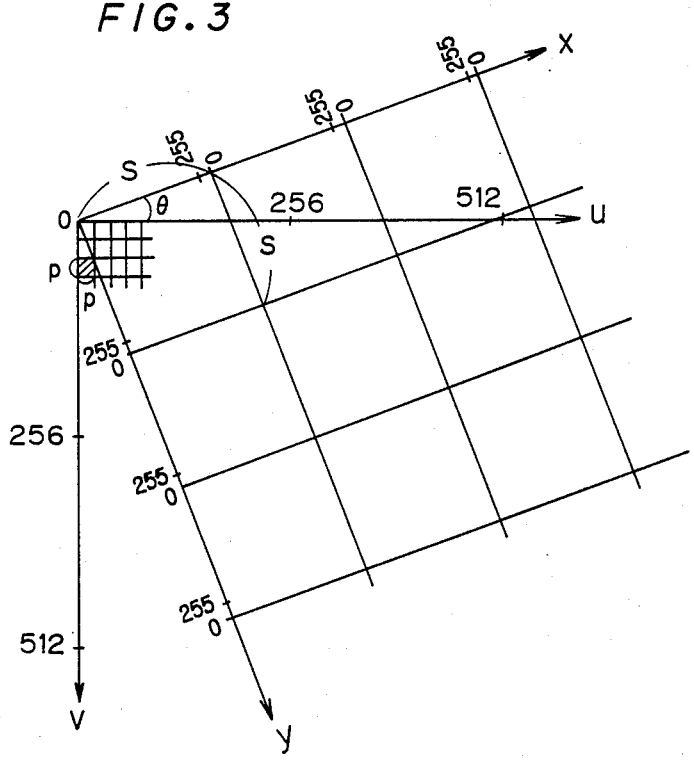
FIG. 3 shows the relation between a film coordinate system u-v and a screen coordinate system x-y of a screen angle of $\theta$.

FIG. 3 shows the relation between the film coordinate system u-v and the screen coordinate system x-y of the screen angle of $\theta$. Assuming that the length of each side of each exposure pixel is P, the length of each side of each unit halftone dot region is S and each halftone dot region is divided into 256×256 elements, the following equation holds:

$$x = \left\{ (u \cos \theta - v \sin \theta)\left( P/\frac{S}{256} \right) \right\} \mod 256 \quad (1)$$

$$y = \left\{ (u \sin \theta - v \cos \theta)\left( P/\frac{S}{256} \right) \right\} \mod 256 \quad (2)$$

Setting $$\cos \theta \left( P/\frac{S}{256} \right) = \alpha \quad (3)$$

$$\sin \theta \left( P/\frac{S}{256} \right) = \beta, \quad (4)$$

$\alpha$ and $\beta$ are constants determined by the screen angle and the screen ruling, and the screen coordinates (x, y) are found by:

$$x = (u\alpha - v\beta) \mod 256 \quad (5)$$

$$y = (u\beta + v\alpha) \mod 256 \quad (6)$$

Such a calculating method is described in detail in U.S. Pat. No. 4,673,971.

A beam control signal generator 11 receives the image signal $S_{ig}$ and the screen coordinates (x, y) as obtained to generate an exposure beam on/off control signal based on the same as hereinafter described, which is in turn supplied to a recording head 7 to control on and off states of an exposure beam of the recording head 7, to record a halftone dot duplicate image of the original 2 on a recording film 12 put on the recording cylinder 5.

Figure 4:
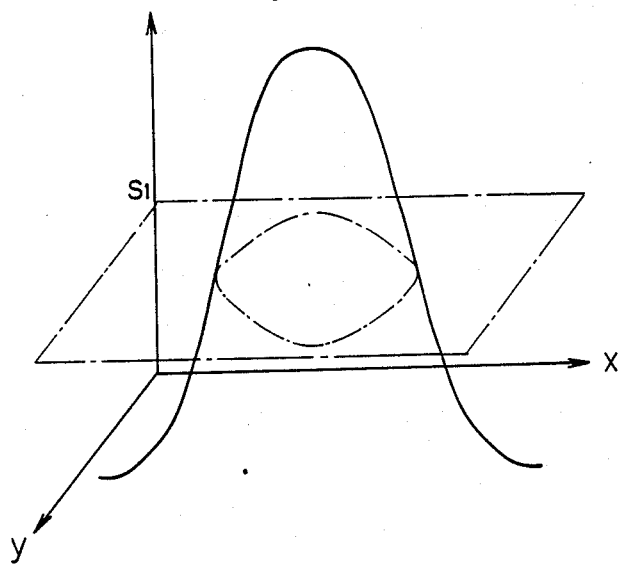
FIG. 4 and FIG. 5 are schematic diagrams showing how to find an upper limit value and a lower limit value.
Figure 5:
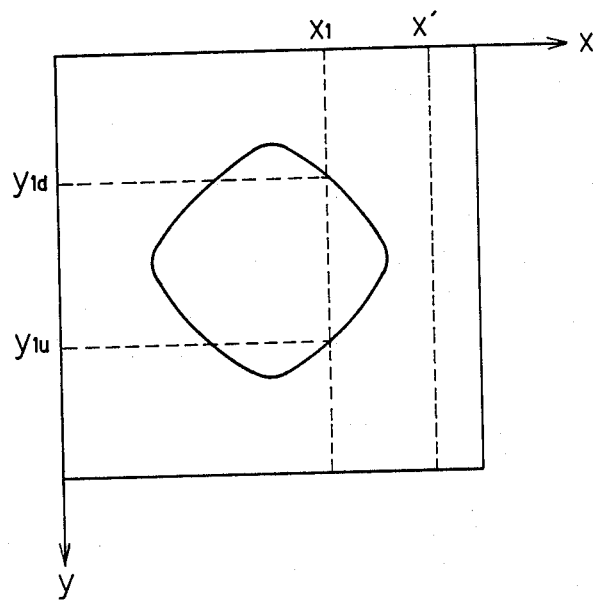

The beam control signal generator 11 has an upper limit value memory 13 and a lower limit value memory 14 which store previously calculated upper and lower limit values of the y-coordinate for each combination of the density value of the image signal $S_{ig}$ and the x-coordinate. FIG. 4 and FIG. 5 are schematic diagrams showing how to find the upper and lower limit values in accordance with the density distribution pattern of the imaginary screen. A phantom line in FIG. 4 shows a plane on which the density value of the image signal $S_{ig}$ is $s_1$. The cross section of a density distribution mountain of an unit halftone dot cut by the plane is shown in FIG. 5. The upper and lower limit values $y_{1u}$ and $y_{1d}$ of the y-coordinate for a given x-coordinate $x_1$ are determined as shown in FIG. 5. Namely, values $y_{1d}$ and $y_{1u}$ are stored in the upper limit value memory 13 and the lower limit value memory 14, respectively, with respect to the combination of the density value $s_1$ and the x-coordinate $x_1$. On the other hand, values $y_u$ and $y_d$ which satisfy $y_u < y_d$ are stored in the upper limit value memory 13 and the lower limit value memory 14, respectively, with respect to the x-coordinate $x'$ shown in FIG. 5 having no intersection with the cross section of the density distribution mountain. Cross section patterns similar to that shown in FIG. 5 are supposed with respect to respective density values (e.g., 256 gradation levels of 8 bits) of the image signal $S_{ig}$ to find upper and lower limit values $y_u$ and $y_d$ of the y-coordinate for respective x-coordinates for each of the cross section patterns, to previously store the same in the upper limit memory 13 and the lower limit memory 14, respectively.

Referring to FIG. 2 again, the upper limit memory 13 and the lower limit memory 14 are supplied with the image signal $S_{ig}$ from the color arithmetic part 4 and the x-coordinate x from the screen coordinate generator 10 to read out the corresponding upper and lower limit values $y_u$ and $y_d$, respectively, which are in turn input to one input terminals of comparators 15 and 16, respectively. The comparators 15 and 16 are also supplied at the other input terminals with the y-coordinate y generated by the screen coordinate generator 10. The comparator 15 compares the y-coordinate y with the upper limit value $y_u$ to determine whether or not the former is smaller than the latter, and the comparator 16 compares the y-coordinate y with the lower limit value $y_d$ to determine whether or not the former is larger than the latter. When the both conditions are satisfied, i.e., $y_u > y > y_d$ is satisfied, the exposure beam on/off control signal indicating lighting of the exposure beam is supplied through an AND gate 17 to the recording head 7 which responsively exposes the recording film 12 by the exposure beam.

According to the above embodiment, cross section patterns of the density distribution of the unit halftone dot, similar to that shown in FIG. 5, are supposed with respect to respective density values of the image signal $S_{ig}$ to find data to be stored in the upper limit value memory 13 and the lower limit value memory 14, and hence different halftone dot configurations such as a circle, a triangle, and a square can be freely applied with respect to each specific density range of the image signal $S_{ig}$, as far as the respective configurations take only one upper and lower limit values $y_{1d}$ and $y_{1u}$.

Figure 1:
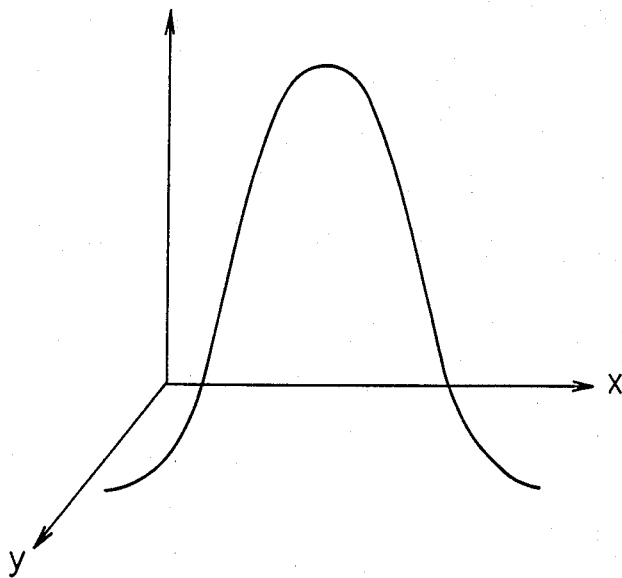
FIG. 1 shows an example of the density distribution pattern of a unit halftone dot stored in a pattern memory.
Figure 6A:
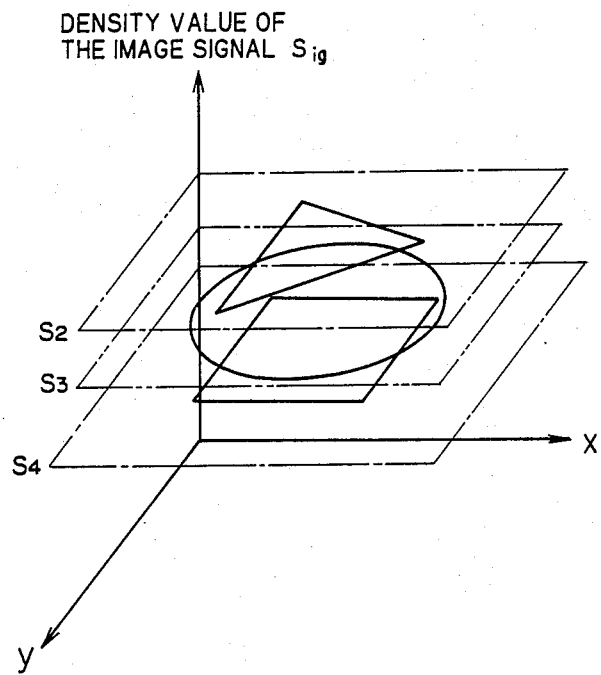
FIG. 6A and FIG. 6B show an example of application of different halftone dot configulations.
Figure 6B:
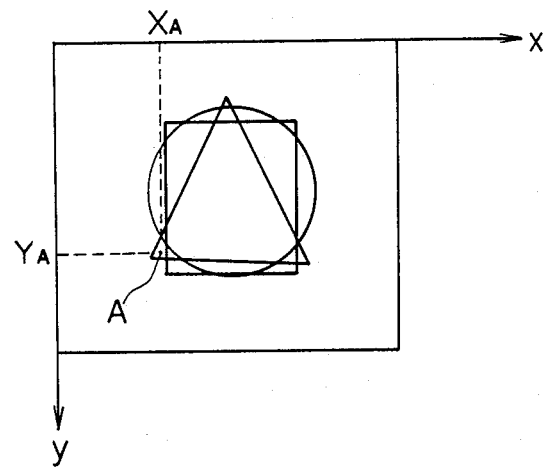

FIG. 6A shows an example of application of different halftone dot configurations, wherein triangle, circle and square halftone dot configurations are used for a light density value range including a density value $s_2$, a medium density value range including a density value $s_3$ and a deep density value range including a density value $s_4$, respectively. These configurations are shown in FIG. 6B in overlapped manner on the x-y coordinate plane. According to the example, a point A shown in FIG. 6B corresponds to a black level on the recording film 12 when the density value of the image signal $S_{ig}$ is $s_2$ while corresponds to a white level when the same is $s_3$ or $s_4$. According to the conventional method shown in FIG. 1, on the other hand, it is impossible to obtain the black level when the density value of the image signal $S_{ig}$ indicates relatively light density and the white level when the same indicates relatively deep density, with respect to the given screen coordinates $(X_A, Y_A)$.

Figure 7:
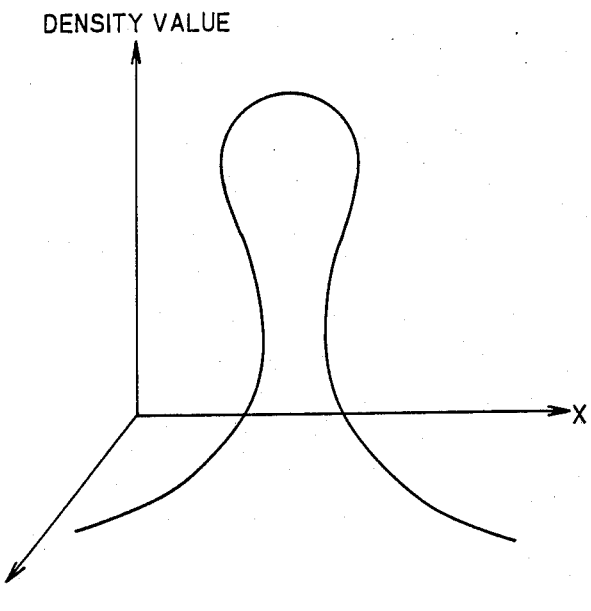
FIG. 7 shows an example of a density inversion.

Further, according to the present invention, the density distribution pattern of the unit halftone dot shown in FIG. 7 is also applicable to invert the density for the purpose of attaining another special effect.

Assuming that the number of the divided elements in the unit halftone dot region of a side size of S is 256×256, as shown in FIG. 3, and the gradation of the image signal $S_{ig}$ is 8 bits (256 gradation levels), each of the upper limit values in memory 13 and the lower limit values in memory 14 needs memory capacity of 256 (divisional number in the x-axis direction)×256 (gradation levels)×8 (divisional number in the y-axis direction) bits. On the other hand, a pattern memory employed in the conventional method as hereinbefore described needs 256 (divisional number in the x-axis direction)×256 (divisional number in the y-axis direction)×8 (gradation levels) bits, on the same condition. Therefore, twice as large memory capacity is needed in the above embodiment as compared with the conventional method. In the present invention, however, less memory capacity than the conventional method is needed, as the divisional number, i.e., the number of the divided elements, of the unit halftone dot region is increased in order to improve halftone dot quality. Assuming that the divisional number is 1024×1024, for example, the upper limit value memory 13 and the lower limit value memory 14 according to the present invention need capacity of 1024×256×10×2 bits in total, and the pattern memory according to the conventional method needs capacity of 1024×1024×8×1 bits, the former being five eighth of the latter. Such a memory capacity reduction effect according to the present invention is enhanced as the divisional number of the unit halftone dot region is increased.

Figure 8:
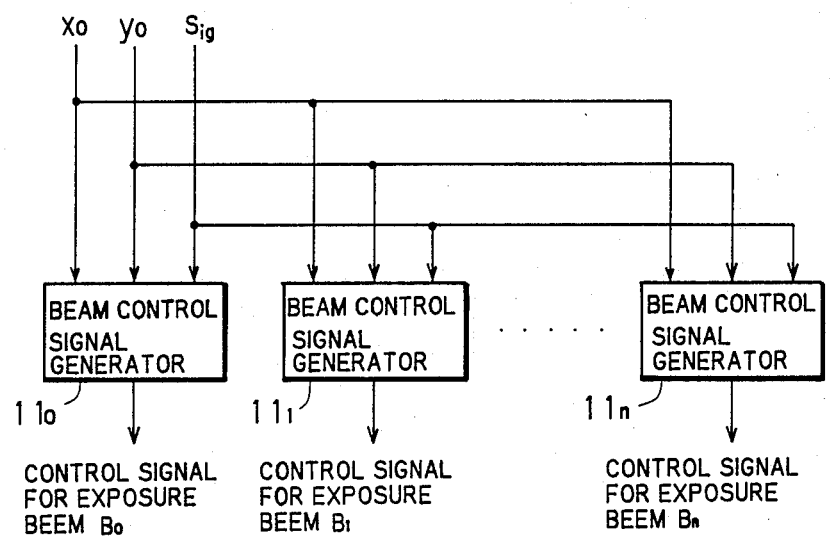
FIG. 8 is a block diagram showing another embodiment of the halftone dot generator according to the present invention.

FIG. 8 is a block diagram showing another embodiment of the halftone dot generator according to the present invention to be applied to a multibeam exposure system using a plurality of exposure beams for rapid halftone dot generation. The halftone dot generator comprises beam control signal generators $11_0$ to $11_n$ corresponding to exposure beams $B_0$ to $B_n$, respectively. Each of the beam control signal generators $11_0$ to $11_n$ has the same structure as that of the beam control signal generator 11 shown in FIG. 2. The beam control signal generators $11_0$ to $11_n$ are supplied with virtual screen coordinates $x_0$ and $y_0$ corresponding to the exposure beam $B_n$ to generate on/off control signals for the exposure beams $B_0$ to $B_n$, respectively, on the basis of the values $x_0$ and $y_0$.

Figure 9:
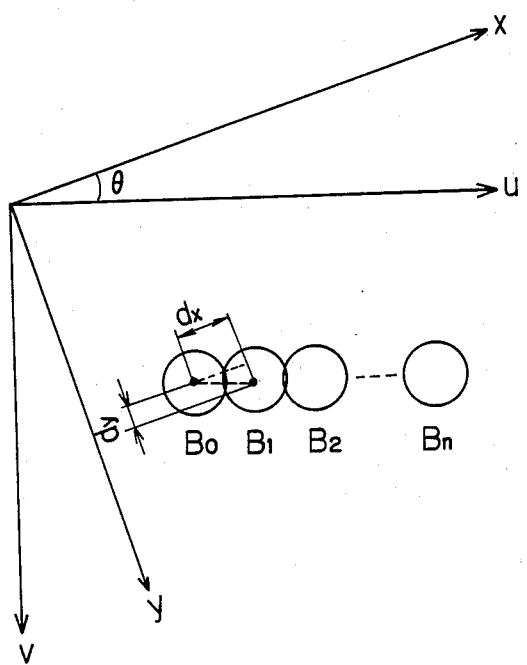
FIG. 9 shows the relationship of exposure beams in a multibeam system.

The exposure beams $B_0$ and $B_n$ are in the relation shown in FIG. 9 with respect to the film coordinate system u-v and the screen coordinate system x-y, and hence data to be stored in upper and lower limit value memories (not shown) in the beam control signal generators $11_1$ to $11_n$, similar to the upper and lower limit value memories 13 and 14 shown in FIG. 2, can be found on the basis of a density distribution pattern, such as the pattern shown in FIGS. 4 and 5, for finding data to be stored in upper and lower limit memories (not shown) in the beam control signal generator $11_0$, by moving such a density distribution pattern by distances of $d_x$ and $d_y$ in the directions of x-axis and y-axis, respectively, in sequence. Thus, multibeam exposure according to the present invention can be performed as far as a screen coordinate generator (not shown) similar to the screen coordinate generator 10 shown in FIG. 10 generates only x-coordinate and y-coordinate values for the exposure beam $B_o$.

The beam control signal generator 11 may be replaced by a look-up table memory, if the memory capacity permits. Although upper and lower limit values of the y-coordinate are used in the above embodiments, upper and lower limit values of the x-coordinate are also usable. Further, the present invention is applicable not only to the drum type scanner but also to a flat type scanner, to both of black-and-white and color scanners, and not only to an input-and-output integral type scanner but also to an output-purpose scanner.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A halftone dot generator for use in a recording system for recording a halftone dot image on a photosensitive material by an exposure beam, comprising:
    means for detecting a position of said exposure beam on said photosensitive material;
    means for converting said position of said exposure beam as detected into virtual screen coordinates (x, y) in a prescribed screen angle and a prescribed screen ruling;
    means for providing an image signal corresponding to said position of said exposure beam as detected; and
    means for receiving said coordinates (x, y) and said image signal to provide a control signal indicating lighting of said exposure beam when one of said coordinates (x, y) as received is in between an upper limit value and a lower limit value which are previously determined for each combination of the other one of said coordinates (x, y) and a density value of said image signal.

2. A halftone dot generator in accordance with claim 1, wherein said means for receiving includes a look-up table memory for receiving said coordinates (x, y) and said image signal to read out said control signal in accordance with a combination of said coordinates (x, y) and said density value of said image signal.

3. A halftone dot generator in accordance with claim 1, wherein
    said means for receiving comprises:
    memory means for receiving said one of said coordinates (x, y) and said image signal to read out said upper limit value and said lower limit value of said other one of said coordinates (x, y) as previously stored; and means for providing said control signal when said first one of said coordinates (x, y) is in between said upper limit value and said lower limit value as read out.

4. A halftone dot generator in accordance with claim 3, wherein
said memory means comprises:
a other memory for receiving said second one of said coordinates (x, y) and said image signal to read out said upper limit value of said other one of said coordinates (x, y) as previously stored; and
a memory for receiving said second one of said coordinates (x, y) and said image signal to read out said lower limit value of said other one of said coordinates (x, y) as previously stored.

5. A halftone dot generator in accordance with claim 3, wherein
said means for providing said control signal comprises:
a first comparator for comparing said first one of said coordinates (x, y) with said upper limit value;
a second comparator for comparing said first one of said coordinates (x, y) with said lower limit value; and
an AND gate for receiving outputs from said first and second comparators to derive said control signal.

6. A halftone dot generator in accordance with claim 1, wherein
said recording system includes a multibeam system using a plurality of exposure beams, and
said control signal is generated for each of said exposure beams.

7. A halftone dot generator in accordance with claim 1, wherein
said means for detecting includes:
a first encorder interlocked with a movement of said exposure beam in a main scanning direction; and
a second encorder interlocked with a movement of said exposure beam in a subscanning direction.

8. A halftone dot generating method for use in a recording system for recording an halftone dot image on a photosensitive material by an exposure beam, comprising the steps of:
detecting a position of said exposure beam on said photosensitive material;
converting said position of said exposure beam as detected into virtual screen coordinates (x, y) in a prescribed screen angle and a prescribed screen ruling;
providing an image signal corresponding to said position of said exposure beam as detected; and
providing a control signal indicating lighting of said exposure beam when one of said coordinates (x, y) as converted is in between an upper limit value and a lower limit value, which are previously determined for each combination of the other one of said coordinates (x, y) and a density value of said image signal.

* * * * *